US012704615B2

(12) United States Patent
Berscheid et al.

(10) Patent No.: US 12,704,615 B2
(45) Date of Patent: Aug. 11, 2026

(54) MOUNTING APPARATUS FOR DIRECTIONAL DEPENDENT COMPONENTS

(71) Applicant: Exponent Outdoors LLC, Dickinson, ND (US)

(72) Inventors: Thomas Berscheid, Dickinson, ND (US); John Koos, Dickinson, ND (US)

(73) Assignee: Exponent Outdoors LLC

( * ) Notice: Subject to any disclaimer, the term of this patent is extended or adjusted under 35 U.S.C. 154(b) by 141 days.

(21) Appl. No.: 18/663,026

(22) Filed: May 13, 2024

(65) Prior Publication Data

US 2024/0377517 A1 Nov. 14, 2024

Related U.S. Application Data

(60) Provisional application No. 63/501,444, filed on May 11, 2023.

(51) Int. Cl.
*G01S 7/521* (2006.01)

(52) U.S. Cl.
CPC .................................... *G01S 7/521* (2013.01)

(58) Field of Classification Search
CPC ........ G01S 7/521; B63H 20/007; B63H 20/12
See application file for complete search history.

(56) References Cited

U.S. PATENT DOCUMENTS

| | | | | |
|---|---|---|---|---|
| 4,982,924 | A * | 1/1991 | Havins | G10K 11/006 248/295.11 |
| 7,056,166 | B2 * | 6/2006 | Bernloehr | B63H 20/007 114/144 R |
| 8,991,280 | B2 * | 3/2015 | Wireman | B63H 20/007 114/144 R |
| 9,322,915 | B2 * | 4/2016 | Betts | G01S 15/8902 |
| 9,676,462 | B2 * | 6/2017 | Bernloehr | B63H 25/02 |
| 11,796,661 | B2 * | 10/2023 | Caspall | G01S 7/521 |
| 11,846,734 | B2 * | 12/2023 | Hughes | G01S 7/521 |
| 11,874,372 | B2 * | 1/2024 | Wagner | G01S 15/96 |
| 12,287,416 | B2 * | 4/2025 | Clark | H04N 1/00411 |
| 12,449,521 | B2 * | 10/2025 | Hesse | G01S 15/42 |
| 2022/0390542 | A1 * | 12/2022 | Clark | H04N 1/00411 |
| 2025/0012910 | A1 * | 1/2025 | Bird, Jr. | G10K 11/352 |
| 2025/0014556 | A1 * | 1/2025 | Bird, Jr. | G10K 11/006 |

* cited by examiner

*Primary Examiner* — Eret C McNichols

(74) *Attorney, Agent, or Firm* — Gutwein Law; Tyler B. Droste

(57) ABSTRACT

A mounting device for a directional component, such as a forward-facing transducer or sonar. The mounting device can have a housing portion and a pole portion. The housing portion can include a main body positioned between a top cover and a bottom cover. The main body can have an interior sidewall. A portion of the interior sidewall can have a gear portion. The pole portion can have a gear interface portion that interfaces with the gear portion of the interior sidewall of the main body. As the main body rotates around an axis, the gear portion can turn the gear interfacing portion of the pole portion around the pole axis. The gear ratio can allow for the pole to rotate a rate at least two times greater than the rotation of the main body.

4 Claims, 9 Drawing Sheets

MOUNTING APPARATUS FOR DIRECTIONAL DEPENDENT COMPONENTS

CROSS-REFERENCE TO RELATED APPLICATION

This U.S. patent application claims priority to U.S. Provisional Application No. 63/501,444 filed May 11, 2023, to the above-named inventors, the disclosure of which is considered part of the disclosure of this application and is hereby incorporated by reference in their entirety.

FIELD OF THE INVENTION

The invention relates generally to a mounting apparatus configured to rotate a directional component, such as a Forward-Facing Sonar (FFS) Transducer or other directional dependent components. More particularly the invention relates to a mounting apparatus for a FFS Transducer having a structure comprising a handle and a rotating lower portion/pole, the handle capable of being turned. The rotating lower portion/pole configured for receipt of a transducer, the lower portion/pole capable of rotating on multiple or exponential basis compared to the degree that the handle is turned.

BACKGROUND

Currently there are a number of solutions for Marine/Marine Electronics Forward Facing Sonar (FFS) (i.e. Garmin Livescope, Lowrance Active Target, Humminbird Mega Live). FFS Transducers are a directionally pointed or aimed transducers which capture live imaging. When searching for fish, for example, it is common to aim the transducer at a desired direction and to use the transducer to scan through the desired area within that direction.

Currently a user will mount the transducer to a pole (hand controlled or electronic) or to a trolling motor. When the transducer is mounted to a pole and turned by hand, the pole rotates on a 1:1 basis. This requires the handle to be positioned outside of the gunnel of a boat if a view of a full 360 degrees area is desired. Current non-electric products on the market are made of a solid shaft or multiple solid shafts coupled together (for length) with a ridged handle in which the handle is swung/turned at the same ratio 1:1. This can result in difficulty for the user to completely turn or orient the transducer in the right direction without overly burdening the user's mobility and position on the boat.

There exists a need for an apparatus that can provide a mounting device for a transducer which incorporates an articulated turning mechanism and operates at a higher ratio allowing for a full 360-degree rotation of the transducer without needing a 360-degree lateral swing/turn of the handle.

BRIEF SUMMARY OF THE INVENTION

In one aspect, the present disclosure is related to a mounting apparatus for a directional component. The mounting apparatus can include a housing portion, a pole portion, and a directional indicator. The housing portion can include a top cover, a main body, and a bottom cover. The main body can be positioned between the top cover and the bottom cover. The bottom cover and top cover are removably coupled together to allow for the main body to rotationally move around an axis between the top cover and bottom cover. The main body can have an exterior sidewall and an interior sidewall. The interior sidewall can form an aperture with at least a portion of the interior sidewall having a gear portion. The pole portion can have a first end and a second end. The pole portion can have a first pole with a first end and a second end. The first end can have a gear interfacing member with a gear portion and a cup portion. The gear portion can extend generally perpendicular from a top surface of the cup portion. The cup portion can have a first diameter and the first pole has a second diameter. The first diameter can be greater than the second diameter. The gear portion can interface with the gear portion of the main body. The directional component can be coupled to the second end of the pole portion. The directional indicator can be removably coupled to the first end of the first pole and positioned on a top surface of the top cover. The directional indicator can rotate around an axis of the first pole when the main body is rotated around an axis. The directional indicator points or faces the direction of directional component as it is turned around the axis. The main body can have a first rotational rate around a first axis and the pole portion can have a second rotational rate around a second axis. The rotational rate of the pole portion can be greater than the rotational rate of the main body allowing less movement of the main body to rotate the pole portion one or more rotations. The rotational rate of the pole portion can rotate around its axis twice as fast as the main body rotates round the its axis. The main body can rotate about 180 degrees or a half of a rotation that can then result in the lower pole section rotating about 720 degrees or about 2 full rotations.

In another aspect, the present disclosure is related to a mounting device for rotating a directional transducer around an axis that comprises a housing portion, a lower pole portion and an indicator. A housing portion can include a main body positioned between a top cover and a bottom cover. The main body has an exterior sidewall and an interior sidewall. The interior sidewall can have a gear sidewall portion, wherein the main body is freely rotatable around a first vertical axis between the top cover and bottom cover at prescribed degrees of rotation. A lower pole portion can include a first pole having a first end and a second end. The first end of the pole can have a gear interfacing cup having a cup portion and a gear portion. The gear portion of gear interfacing cup can interface with the gear sidewall portion of the main body. The pole can be rotatable around a second vertical axis at prescribed rate of rotation dependent upon the movement of the main body at the prescribed rate of rotation around a first vertical axis. The pole can rotate around the second vertical axis at a rotational rate greater than the rotational rate of the main body. A directional transducer can be coupled to the second end of the pole and rotate as the pole rotates. A directional indicator can be positioned at the top surface of the top cover. The directional indicator can be coupled to the first end of the lower pole portion and can rotate around the second vertical axis at the same rotational rate of the pole. A graphic portion of the directional indicator can indicate the direction the directional transducer is facing.

In another one aspect, the present disclosure is related to a mounting apparatus that can be used for a directional transducer component. The mounting apparatus can allow the directional transducer component can freely rotate around an axis. The transducer component can rotate around the axis at a different rate of rotation as a handle portion of the apparatus, allowing a user to move the handle less distance to provide a greater rotational effect to the transducer. A directional indicator can provide an indication as to what direction the transducer is facing as it rotates. The rate of rotation of the pole portion can be greater than the rate of rotation of the main body. This can prevent unwanted straining of a user when trying to position the transducer in a direction that would ordinarily require a user to completely rotate the handle or main body with a 1:1 rotation.

In yet another aspect, the present disclosure generally relates to a mounting apparatus for a directional component configured to provide rotational movement of the directional component. The mounting apparatus can include a housing portion and a lower pole portion. The housing portion can include a top cover, a main body, and a bottom cover. The main body portion can be positioned between the top cover and bottom cover and be freely movable around a first axis.

In yet another aspect, the present disclosure generally relates to a transducer mounting apparatus for FFS having a structure comprising a handle portion and a rotating lower portion/pole. The handle portion can be capable of being turned around an axis. The rotating lower pole portion can be configured for receipt of a transducer portion. The lower portion can be capable of rotating on an exponential or greater basis compared to the degree that the handle is rotated around an axis.

In another aspect, the present disclosure is generally related to an apparatus is provided in an assembly that provides a mounting device for a transducer which incorporates an articulated turning mechanism and operates at a higher ratio allowing for a full 360 degree rotation of the transducer portion without needing a 360 degree lateral swing/turn of the handle portion. The apparatus is provided in an assembly that facilitates a full 360-degree rotation of the transducer. Among other things, it is an advantage of the invention to provide a mounting device for FFS that does not suffer from any of the problems or deficiencies associated with prior solutions.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
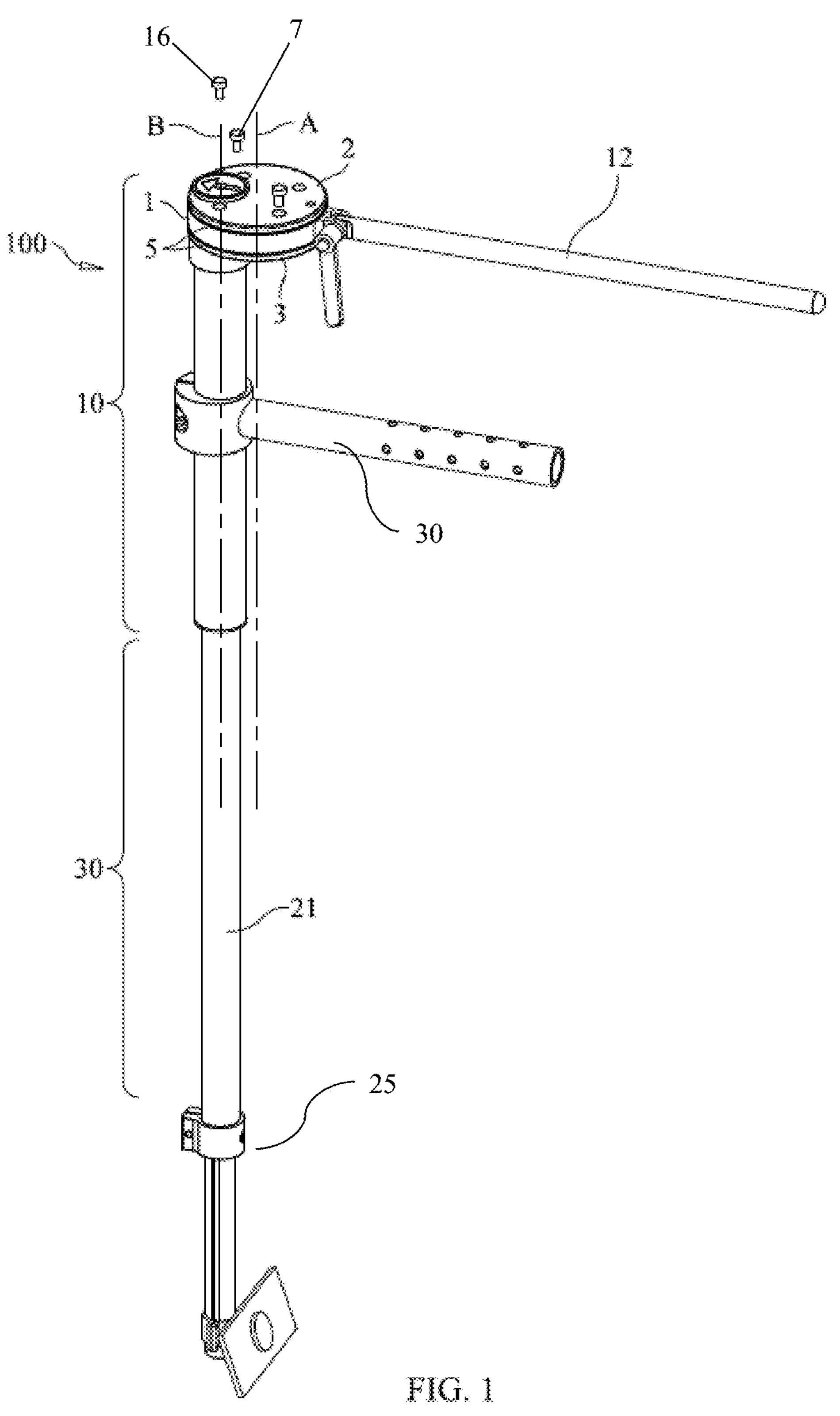
FIG. 1 is a perspective view of an exemplary embodiment of a mounting apparatus of the present disclosure.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit, or scope of the present invention. All such modifications are intended to be within the scope of the disclosure made herein. Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate members being attached to one another. Such joining may be permanent in nature or alternatively may be removable or releasable in nature. Similarly, coupled can refer to a two member or elements being communicatively coupled, wherein the two elements may be electronically, through various means, such as a metallic wire, wireless network, optical fiber, or other medium and methods.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The invention can most generally be described as a mounting apparatus for sonar or other similar components that may require 360-degree rotation by a user without the need to fully rotated an upper portion in order to effectively direct the directional component attached. The invention can alternately be described as a mounting apparatus for FFS having a structure configured to enable for a full 360 rotation.

As shown in FIGS. 1-2, the apparatus 100 of the present disclosure can generally include an upper or housing portion 10 and a lower pole portion 20. The housing portion 1 and the lower pole portion 2 can be coupled together using any suitable means. The housing portion 10 can include a main body 1, a top cover 2, and a bottom cover 3. The main body 1 can have an exterior edge or sidewall 4 that defines the shape of the main body 3. The exterior sidewall 4 can have a top edge 51 and a bottom edge 52. In some exemplary embodiments, the main body 1 can have generally a circular shape with a first diameter from the exterior sidewall 4 and a smaller diameter between the interior sidewall 8.

In some exemplary embodiments, one or more housing bushings 5*a,b* can be positioned between the respective portions of the housing portion 10. The housing bushing 5*a,b* can be disposed between the top cover 2 and the main body 1 and between the bottom cover 3 and the main body 1. Housing bushings 5 can take any suitable form including but not limited to bearings, bushing, or gaskets and can further provide a seal between the top cover 2, main body 1, and bottom cover 3 portions as well as allow for smooth rotation of the main body 1. The housing bushings 5*a,b* can provide a smooth wear surface to better allow the main body 1 to rotate between the top cover 2 and the bottom cover 3. In some exemplary embodiments, the housing bushings 5 can be comprised of a softer material than the main body 1, top cover 2, and bottom cover 4. In these embodiments, the bushings 5 can act as a replaceable wear surface between components. Similarly, bushing 5 can be comprised of a lower coefficient of friction to allow for the rotational movement of the main body 1 between the top cover 2 and bottom cover 3. The housing bushings 5 can have a lip 54 to maintain position between the respective housing portion components. In other embodiments, the top cover, bottom cover, and main body can be comprised of all the same materials, or alternatively different components to allow for the main body 1 to rotate between the top cover 2 and the bottom cover 3.

The main body 1 can have an interior sidewall 8 that can define an opening 9 through the main body. The opening can be generally circular with a second diameter that is less than the first diameter of the exterior sidewall 4. The opening 9 can allow for one or more fasteners coupling the top cover 2 to the bottom cover 3 to not be contacted as the main body 1 can freely rotate around an axis. In some exemplary embodiments, the pole portion 20 can have a directional component 30, including but not limited to a transducer assembly 30 coupled to anywhere along the length of the lower pole portion 20. The directional component can be secured to the pole portion 20 using any suitable means, including but not limited to a clamp or fastener. In some exemplary embodiments, the interior opening 9 can have one or more stopping portions that can be configured to interface with a portion of the top or bottom cover to limit the rotation of the main body 1 between the top cover 2 and bottom cover 3. In some exemplary embodiments, the fasteners 7 can function as interfacing portions of the stopping portions of the main body.

In some exemplary embodiments, the main body can have a lip edge surface 51 formed on the top side and the bottom side. The lip edge 53 can be formed between the top edge 51 and bottom edge 52. This can allow one or more bushings 5 that can have a corresponding lip 54 to be located on the respective sides of the main body as shown in FIGS. 2B-3. Similarly, the top cover and bottom cover can have respective lip 55, 56 of edge that is formed with a diameter less the exterior sidewall of the respective cover to locate the bushings or the main body lip 53. The various components and lips can be nested together to form the housing portion 10 as shown in FIG. 3.

The top cover 2 and bottom cover 3 can be removably coupled together utilizing any suitable means, including but not limited to one or more fasteners 7. In some exemplary embodiments, the top cover and bottom cover can have one or more corresponding apertures 6 to allow for a fastener(s) 7 to couple the two components together. The main body 1 can be positioned between the top cover 2 and bottom cover 3, along with one or more housing bushings 5*a,b*. One or more fasteners 7 to secure and maintain the position of the main body 1 between the top cover 2 and the bottom cover 3. The diameter of the lip edge 54 of the bushings 5 can be less than the diameter between the main body lip 1 to allow the main body to house the bushings 5. The top cover lip 55 and bottom cover lip 56 can also be less in diameter than the lip 53 of the main body 1 to house a portion of the top cover 2 and bottom cover 3. In other exemplary embodiments with one or more gaskets 5, the top cover lip 55 and the bottom cover lip 56 diameter can be less than the diameter of the bushing lip edge 54. The fasteners 7 and apertures 6 can be configured to maintain the top cover 2 and bottom cover 3 a pre-determined distance between each other so as to not over compress the main body 1 to allow for free rotational movement of the main body around axis A.

Figure 2A:
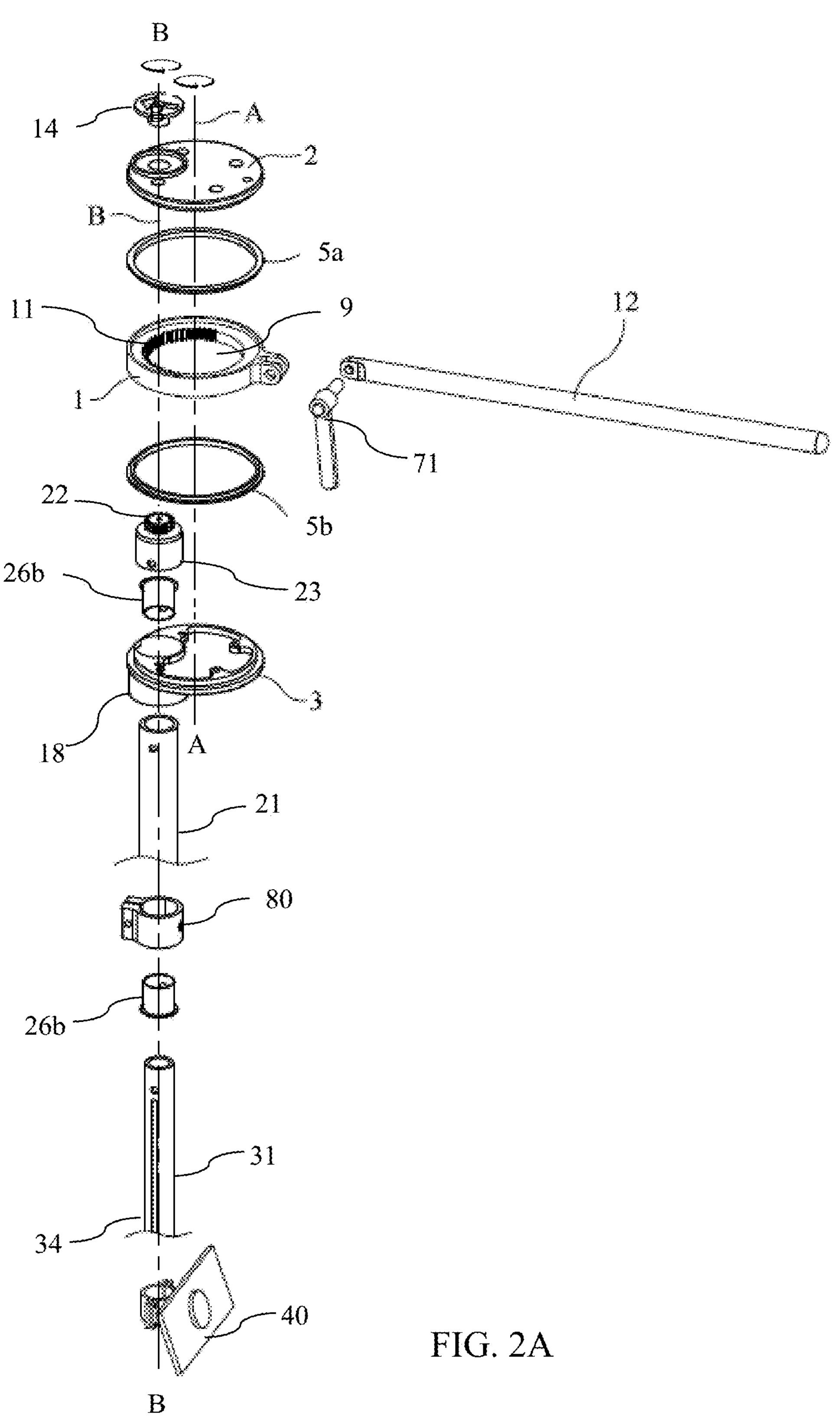
FIG. 2A is an exploded view of an exemplary embodiment of a mounting apparatus of the present disclosure.
Figure 2B:
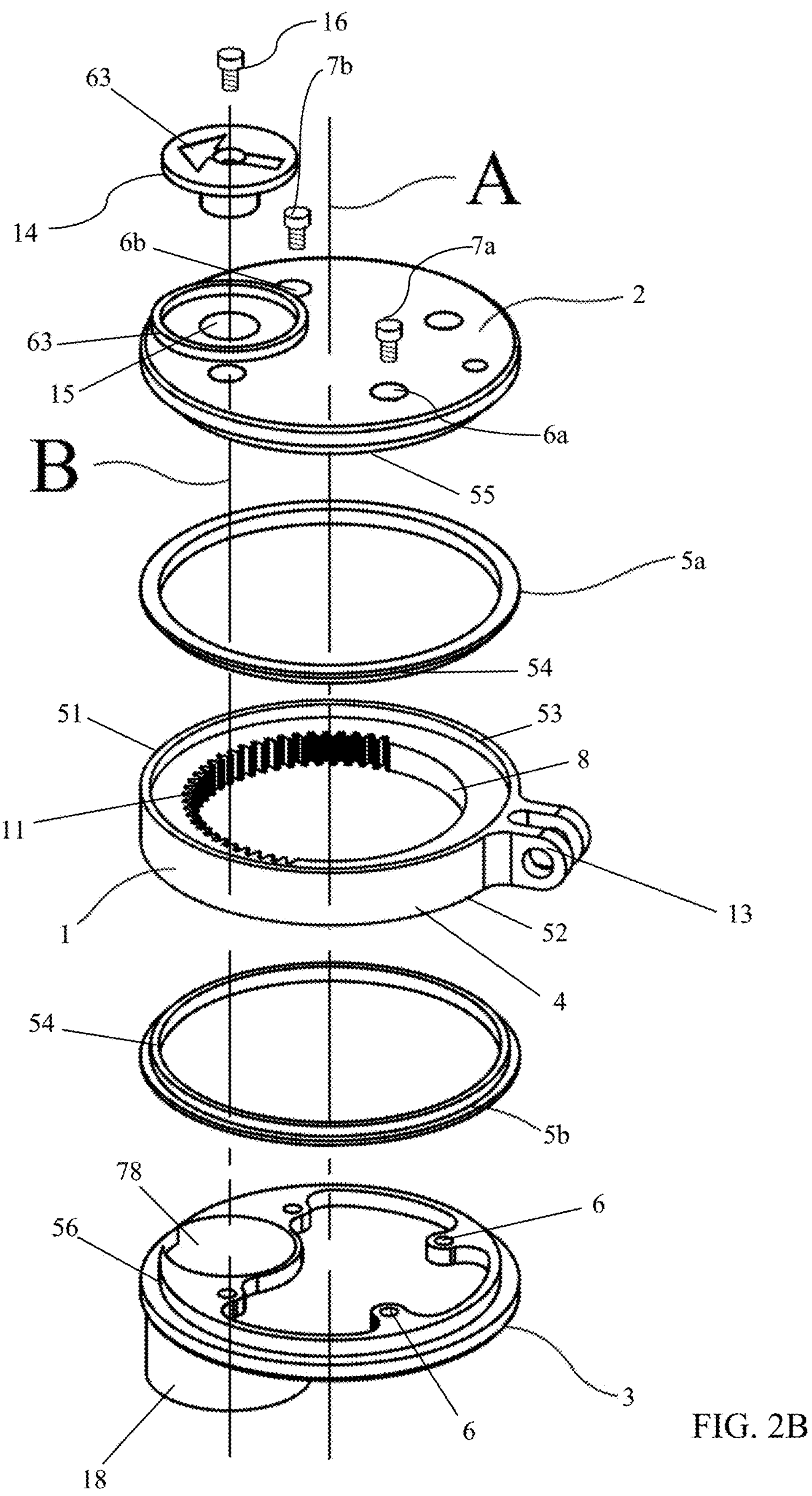
FIG. 2B is an exploded view of an exemplary embodiment of a housing portion of a mounting apparatus of the present disclosure.
Figure 3:
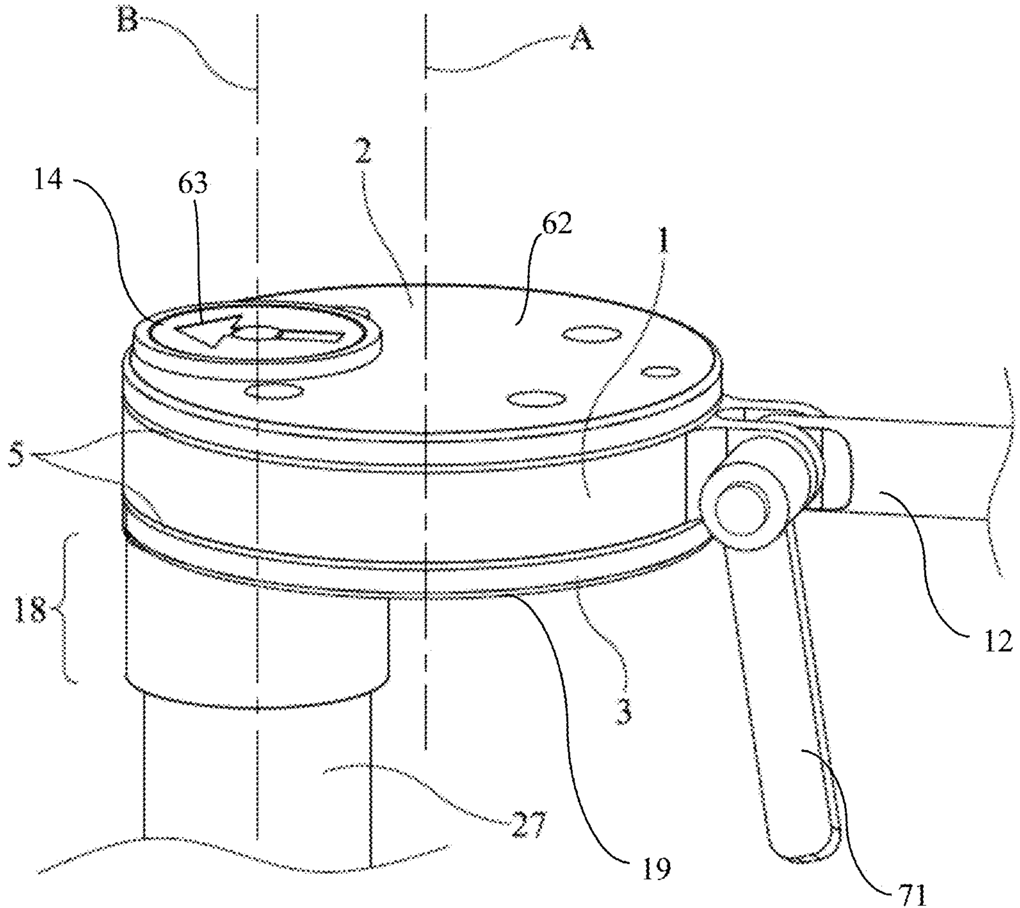
FIG. 3 is a closeup view of a housing portion of an exemplary embodiment of a mounting apparatus of the present disclosure.
Figure 5:
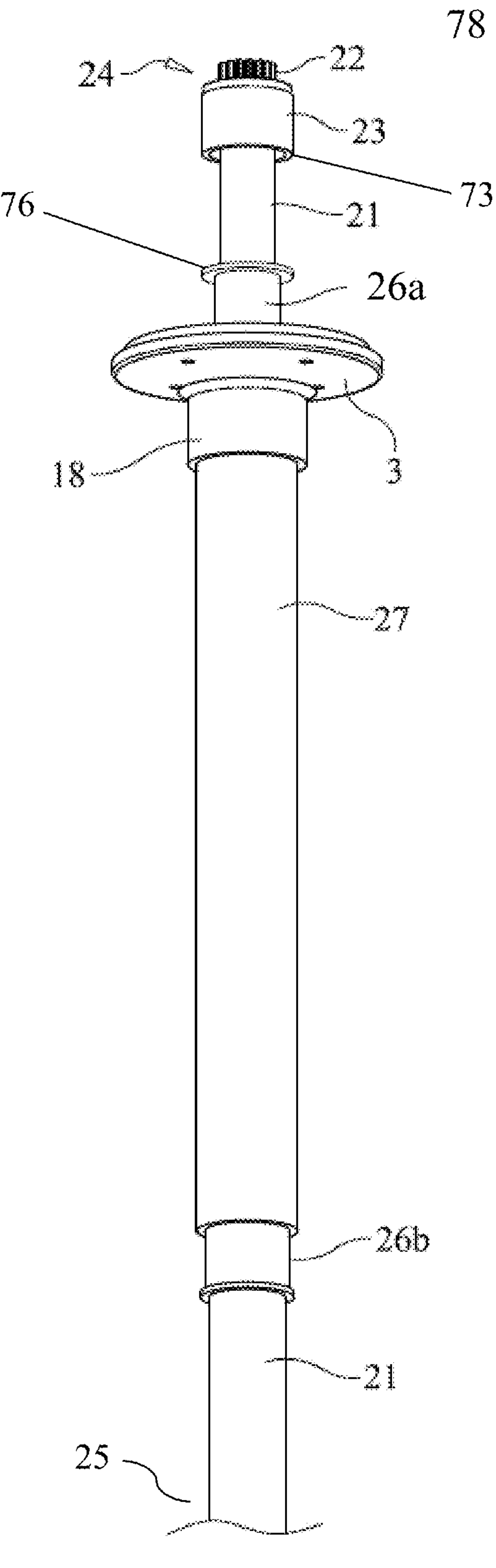
FIG. 5 is a partial exploded view of a first pole within a bottom cover of an exemplary embodiment of a mounting apparatus of the present disclosure.

In some exemplary embodiments, at least a portion of the interior side wall 8 can have a gear portion or gear teeth 11 as shown in FIG. 2 and FIG. 5. The gear portion 11 can be formed into the interior sidewall 8 of the main body 1. In another exemplary embodiment, the gear portion 11 can be a separate assembly coupled to the interior sidewall 8 of the main body 1. In some exemplary embodiments, only a portion of the interior sidewall will include a gear portion or teeth 11. The teeth 11 can be configured to interface with an inside gear portion 22 of a lower pole portion 20 of the apparatus 100. In some exemplary embodiments, gear portion 11 can be on about half of the interior circumference of the main body as shown in FIG. 2A-B.

The housing portion 10 can further include a handle portion 12. In some exemplary embodiments, the handle portion 12 can be removably coupled to a mounting point 13 on the main body 1. Any suitable fastener 71 can be used, including but not limited to a nut and bolt or compression or quick-release skewer or clamp. In some exemplary embodiment, the mounting point 13 or handle portion 12 can be positioned directly opposite from the gear portion 11 of the main body 1. The position of the handle portion 12 opposite the gear portion 11 provides an easier range of motion of the main body 1 around the respective axis (Axis A) thereby turning the lower portion 20.

The handle portion 12 can be pivotably coupled to the main body 1 to allow for a user to easily move the angle of the handle portion 12 to a desired height depending upon the user and desired orientation of the handle. Alternatively, the handle portion 12 can be formed as part of the main body and extend generally perpendicularly from the exterior sidewall 4 of the main body 1. In some exemplary embodiment, the handle portion 12 can be adjustably coupled to the main body 1 to allow a user to adjust the position of the handle 12 along a first plane. As shown in FIG. 1, the handle 12 can be pivotably coupled to the housing portion or main body 1. This can allow a user to lower or raise the position of the handle portion 12 depending upon their position within the boat (i.e., lowered if they are sitting vs. raised if standing).

In some exemplary embodiments, the top cover 2 can have a first side 62 further including a directional indicator 14. The directional indicator 14 can take any suitable shape including but not limited to a circular shape with an etched or graphic indicator 63 on the top surface of the directional indicator that corresponds to the direction of the directional component 30. The directional indicator 14 can be removably coupled to the gear portion 22 of the lower pole portion 20. In some exemplary embodiments, the top surface 62 of the top cover 2 can include a raised perimeter edge 63 to function as a housing edge for the directional indicator 14. An aperture 15 can be formed to allow for a fastener 16 to couple the directional indicator 14 to the inside gear portion 22 or top of the pole 21 of the lower pole portion 20.

The bottom cover 3 can have a housing 18 with an aperture 78 formed therethrough that can allow for a pole portion 20 to be positioned therethrough into the interior of housing portion 10. The pole portion 20 can be rotatable within the housing portion 10. One or more bushings 26 can be positioned at each end of the bottom cover 3 to interface with the pole portion 20 to allow for smooth movement and rotation of the pole portion 20 within the bottom cover 3. A directional indicator 14 can rotate around an axis (Axis B) between one or more positions when the main body 1 is moved around the center axis of housing (Axis A), which in turn moves the directional indicator with the first pole 21 around a central pole axis (Axis B) between one or more positions. The graphic indicator 63 can be an arrow or line to point or correspond to the direction the sonar component 30 or directional component is facing. In some exemplary embodiments, as the pole portion 20 rotates around the respective axis as the main body is rotated around its respective axis thereby providing a user an indication as to the direction of the directional component 30.

The main body can be moved between positions to thereby move the pole portion 20 at a prescribed relative rate between multiple positions. In one exemplary embodiment, as the handle portion 12 or main body 1 is moved rotationally around the axis A, the pole portion 20 can be turned around the same axis or different axis (Axis B) at a different rate than the handle portion 12 or main body 1. The directional indicator 14 can indicate to the user where the transducer assembly 30 is pointing as the handle portion 12 is turned. This enables a user to easily identify the direction the transducer or directional component 30 is pointed during the rotation of the handle due to the different rotational rate between the main body 1 and the pole portion 20. The indicator 14 can be coupled to the top of the gear cup assembly 23 through a hole in the top cover 2 which can be smaller than that gear cup assembly.

In one exemplary embodiment, the directional component 30 or transducer assembly 30 can be coupled towards the bottom end of the pole portion 20. The pole portion 20 can be comprised of any suitable material including but not limited to metal, round stock, or other rigid tube materials. A portion of the post portion 20 can be housed within the housing portion 10 and a second end 25 of the pole portion 20 can extend outside of the housing portion 10. In some exemplary embodiments, the pole portion 20 can include a first pole 21. The pole 21 can be removable couplable to the housing or top portion 10 or placed within the housing portion 18 of the bottom cover. One or more bushings 26 can take any suitable form, including but not limited to one or more bushings, bearings, or gaskets. The bushings 26 can further be utilized to provide a seal between components.

A first pole 21 can have a first end 24 and a second end 25. A first end 24 of the pole 21 can have a gear portion 22 or pole gear interface. In some exemplary embodiments, the pole gear interface 22 can be comprised of a machine cup assembly 23 that can be removably coupled to the first end of the pole 21. Alternatively, the gear portion 22 can be permanently formed or attached to the first end 24 of the pole 21. The gear portion 22 of the pole 21 can interface with the gear portion 11 of the main body 1. The cup portion 23 can primarily be housed within the housing portion 18 with the gear interface portion 22 extending up to interface with the gear portion 11 of the interior sidewall 8.

In some exemplary embodiments, the gear ratio between the pole gear interface 22 and the gear portion 11 of the main body 1 can be between about 2:1 to about 8:1 or any other desired ratio. In some exemplary embodiments, the gear ratio will be equal to or greater than 2:1. This allows the main body 1 to rotate fewer rotations or degrees of rotation while providing a greater rotational movement of the lower pole portion 20.

In one exemplary embodiment the housing portion can have a central vertical axis (Axis A) which the main body 1 can rotate around between about 0 and 270 degrees, or about 0 to 180 degrees, or between about 0 and 135 degrees around the axis. In other exemplary embodiments, the main body 1 can rotate around Axis A at least about 180 degrees. In other exemplary embodiments, the main body 1 will rotate around Axis A no more than 180 degrees. The lower pole portion can have a central vertical axis which the lower pole portion rotates around between about 0-720 degrees. In one exemplary embodiment, the movement of the main body 1 of about 180 degrees can result in about 360 degrees of movement of the pole portion 20. In another exemplary embodiment, the movement of the main body about 180 degrees can result in in about 720 degrees of movement of the pole portion.

In other exemplary embodiments, the main body may have 90 degrees of rotation resulting in about 360 degrees of rotation of the pole portion 20. The gear ratios of the gear portion 11 of the main body 1 and the gear interface 22 of the pole can be adjusted to suit a user's desired need and the application of the directional component 30. The gear portion 11 can be part of the interior sidewall 8 arc forming a gear ratio with respect to the size of the gear interface 22 of the pole portion 20. As the interior arc moves round the axis the teeth of the gear portion 11 move or turn the gear 22 of the pole portion 20. It should be understood that the gear ratio can be changed to allow for more or less rotation of the pole portion as the main body is rotated around its axis.

Figure 4:
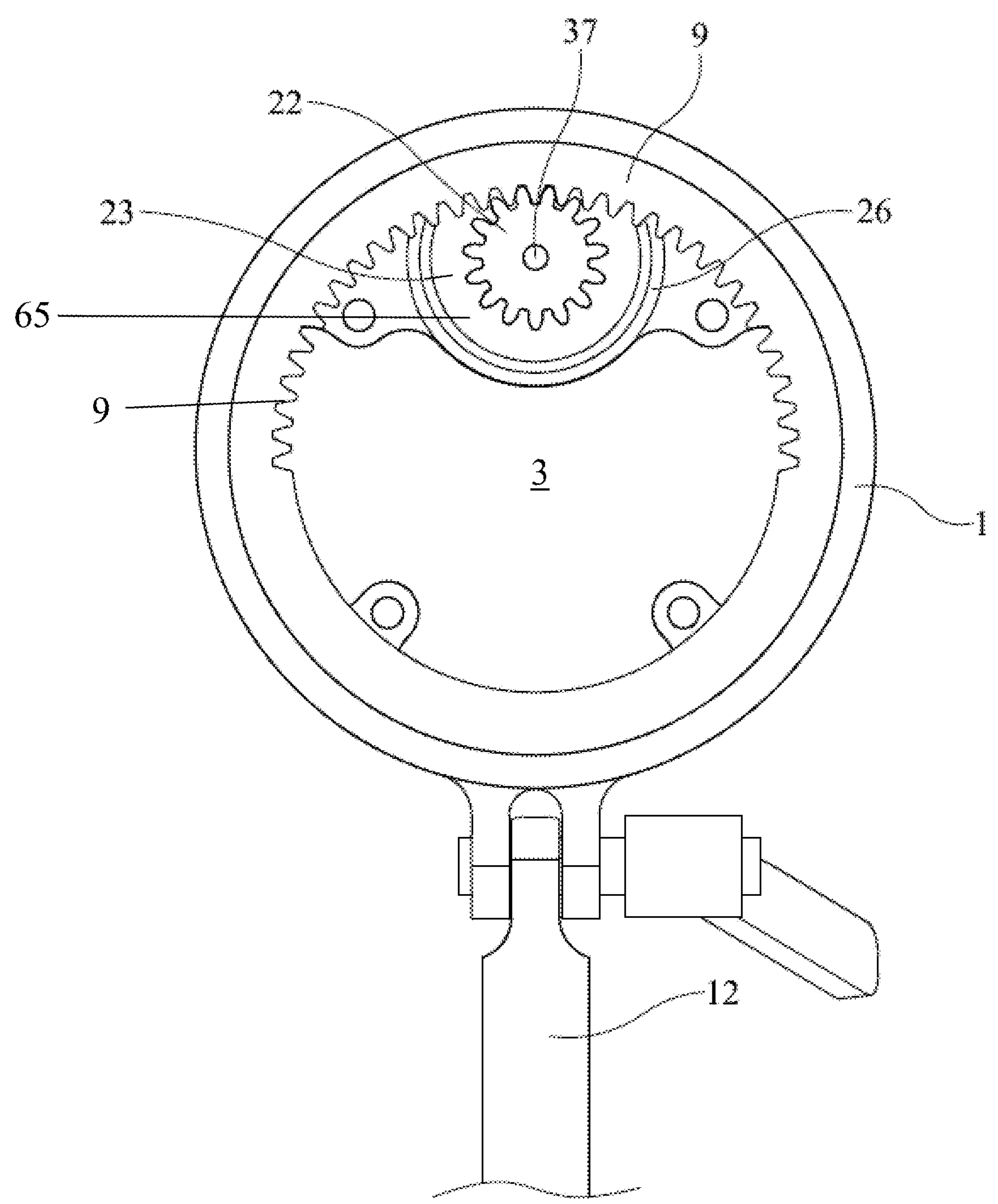
FIG. 4 is a top view of a housing portion of an exemplary embodiment of a mounting apparatus of the present disclosure.

As shown in FIGS. 1 and 3, some exemplary embodiments of the apparatus can have a central axis of the main body (Axis A) that can be different from the central vertical axis of the lower pole portion 20 (Axis B). FIG. 4 illustrates that in some exemplary embodiments, the central vertical axis (Axis B) of the lower pole portion 20 can be offset from the central vertical axis (Axis A) of the main body 1. The inner edge gear portion 11 can interface with the gear interface 22 of the pole 21. This reduces the number of components necessary of the apparatus while also offsetting the pole portion 20. The offset axis can allow for the pole portion to be cantilevered for applications such as mounting options such as a boat mount. In some exemplary embodiments, Axis A can generally pass through the center of the main body opening 9 and Axis B generally runs through the middle of the lower cover 3 aperture 78.

The directional indicator 14 can be coupled to the top of the pole gear interface 22. The pole gear interface 22 can have an aperture 37 to correspond to a fastener 16. Coupling the directional indicator 14 to the pole 21 can aid in securing the pole 21 within the housing assembly 1 as well as providing a guide to a user of the direction the directional component 30 is pointed. In some exemplary embodiments, the top of the pole 21 can have an aperture 37 for fastening the directional indicator 14. The aperture 37 can be a threaded aperture to accept a corresponding threaded fastener 16 to couple the indicator 14 to the pole 21. The rotational indicator 14 will rotate at the same rate as the pole portion 20.

A bottom cover 3 can include an exterior side 19 and an interior side 17. In some exemplary embodiments, an aperture 18 can be formed to provide a housing 18 on the interior side 17 of the bottom cover 3 and extend generally downward from the bottom side 19 of the bottom cover. The housing aperture 78 can provide a housing 18 for a cup and/or gear portion 22 of the first pole 21. In some exemplary embodiments, a tube bushing 26 can be positioned within the housing aperture 18 and between the gear portion 22 to provide a low friction and wear surface to allow for easier rotational movement of the gear portion 22 within the housing 10. In some exemplary embodiments, the bottom edge 73 of the machine cup 23 can rest on top of the top surface 76 of the bushing **26*a* to provide a low friction surface. A gear portion 22 can generally extend upward from the machine cup 23. In some exemplary embodiments, the bottom cover 3 can have a first pole bushing 26*a* positioned within the housing or at the first end of the housing 18 and a second pole bushing 26*b* at the second end of the housing 18 or at the end of the extension portion 27 of the housing as shown inf FIG. 5**.

Figure 6:
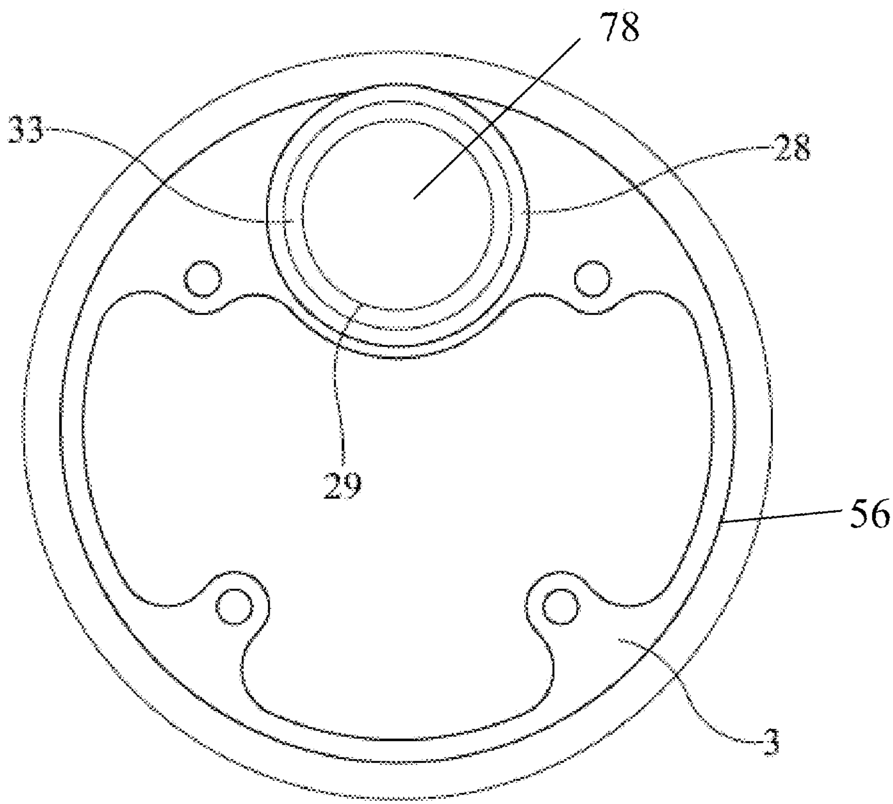
FIG. 6 is a top view of an exemplary embodiment of a bottom cover of an of a mounting apparatus of the present disclosure.

In some exemplary embodiments, a machine cup 23 can have a first diameter which can be greater than the exterior diameter of the first pole 21. This can allow for a portion of a first pole to extend up into a bottom opening of the machine cup 23 to removably couple the two components together. As shown in FIG. 6, a housing 18 of the bottom cover 3 can additionally have a first opening 28 on the interior surface of the bottom cover that is greater than the diameter of the machine cup 23 and a second opening 29 on the second end of the housing 18 with a diameter less than the diameter of the machine cup 23. A ledge 33 can support the pole 21 and machine cup 23 within the bottom cover housing 18. The machine cup 23 or gear portion can be removably coupled to the first end 24 of the pole 21. This can allow for interchangeable gear changing as well as replaceable gears if the gear teeth 22 get worn after repetitive use. In some exemplary embodiments, the machine cup 23 and first end of the first pole 21 can have corresponding apertures to allow for a fastener or matin member to couple to the components together as shown in FIG. 2A. Embodiments where the machine cup 23 has a gear portion 22 may require the first pole to be placed within the housing 18 prior to the main top cover 2.

In some exemplary embodiments, the gear portion 22 can extend perpendicular out of the top plane/surface 65 of the housing 18 to interface with the gear portion 11 of the interior sidewall 8 of the main body 1 as shown in FIG. 4. The machine cup 23 can generally be housed within the housing portion 18 with only the gear portion 22 extending up to interface the gear portion 11 of the main body 1. The housing aperture 78 can allow for the first pole 21 to extend downwardly through the housing aperture 78 and to an exterior environment. In some exemplary embodiments, a mount support or pole extension portion 27 can extend generally downward from the housing aperture 78 to provide additional support and house an additional length of at least the first pole 21. The pole extension portion 27 can be coupled to the housing portion 18 of the bottom cover 3 using any suitable means include welding or mechanically fastening to the housing aperture 18. The pole extension portion 27 of the bottom cover 3 can also provide a mounting surface for one or more mounting assemblies 40. In some exemplary embodiments, a directional component 30 can be mounted to the second end 25 of the first pole 21.

Figure 7:
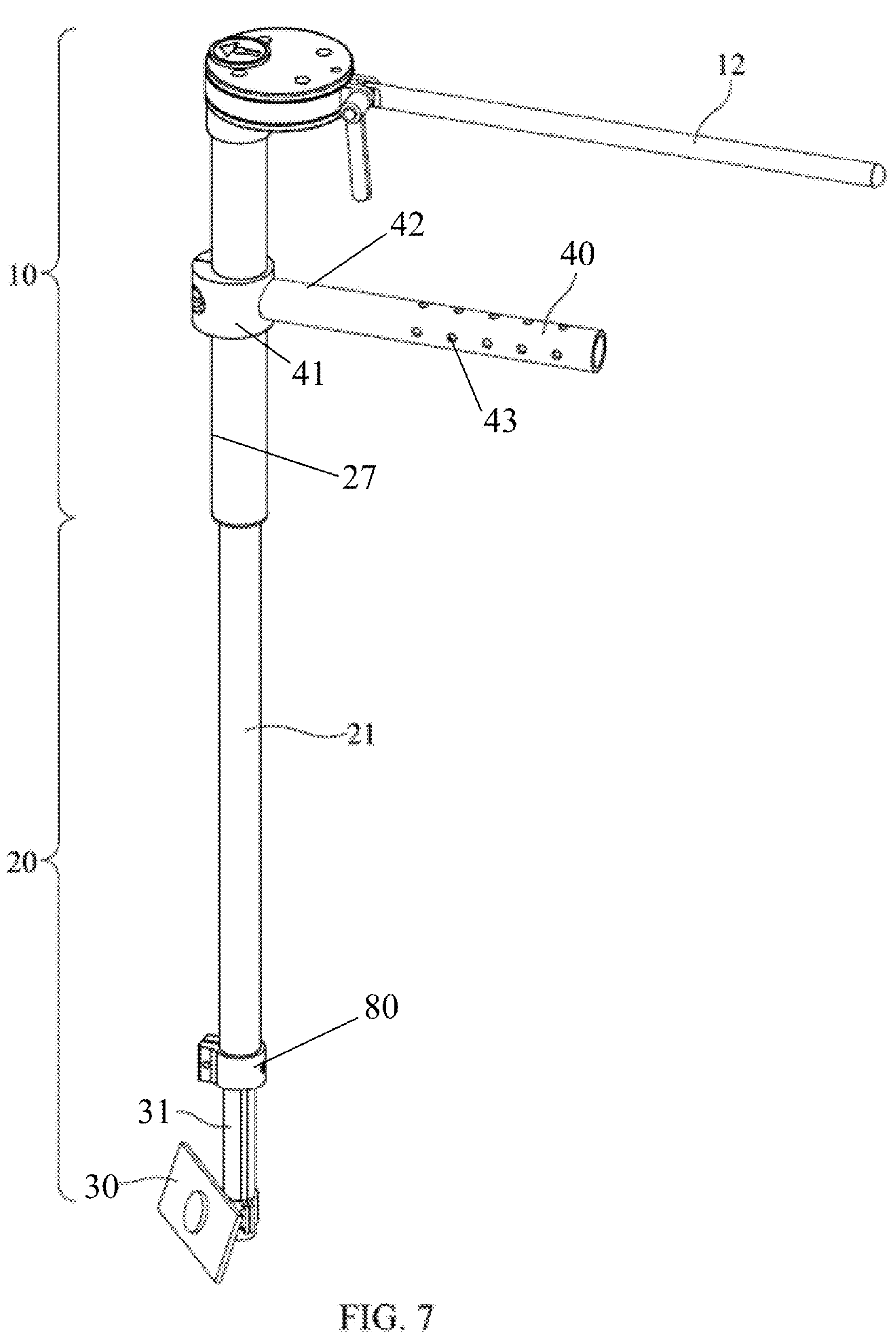
FIG. 7 is a perspective view of an exemplary embodiment of a mounting apparatus of the present disclosure having a first mount with the adjustable tube in a first position.
Figure 8:
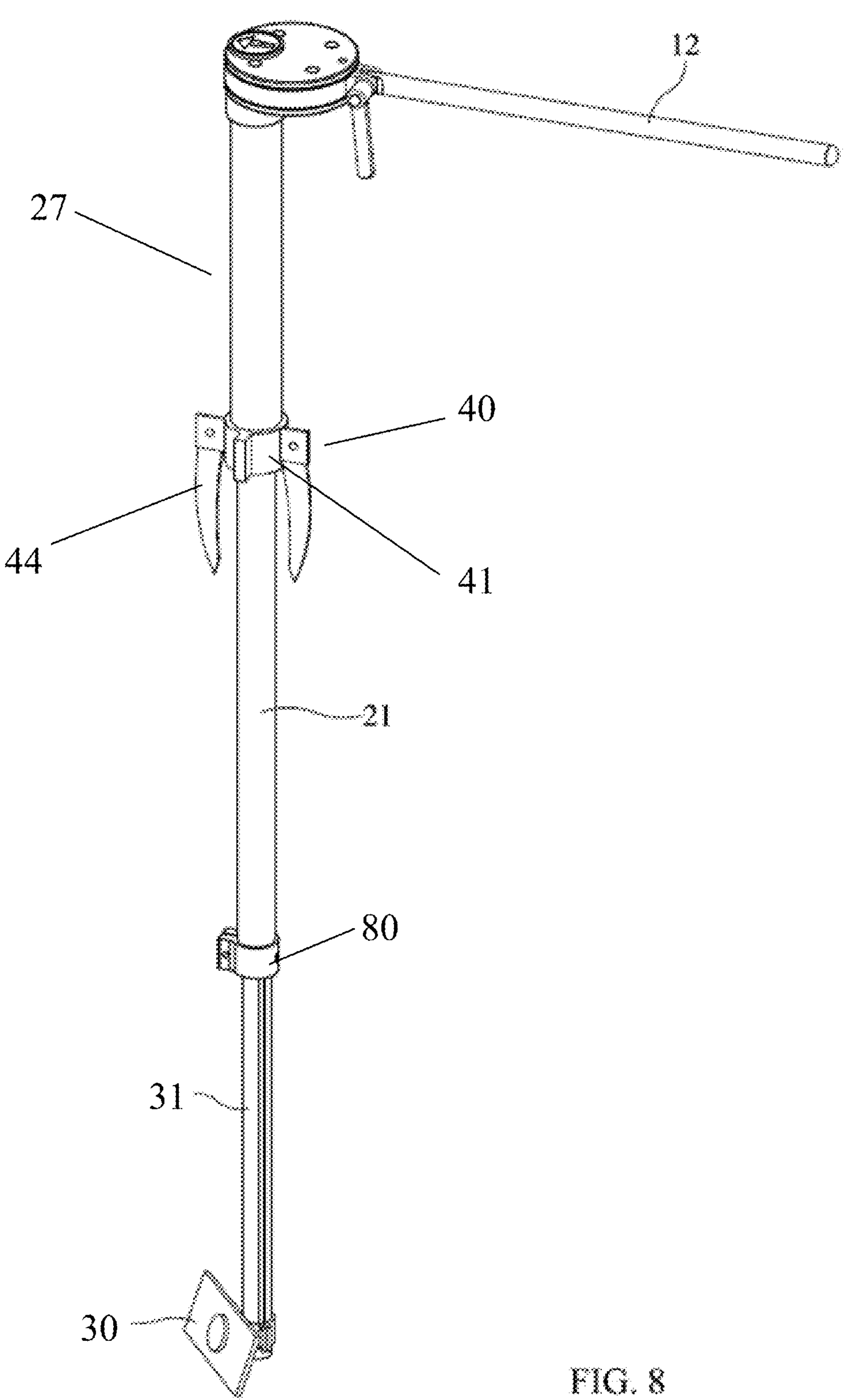
FIG. 8 is a perspective view of an exemplary embodiment of a mounting apparatus of the present disclosure having a second mount type with the adjustable tube in a second position.

As shown in FIG. 7-8, a mounting assembly 40 of the present disclosure can include one or more optional mounting assembly. FIG. 7 illustrates a boat mount assembly that can be removably coupled to the pole housing portion 27. This can allow for easy mounting to a boat that has a suitable receiver. The boat mount assembly 40 can have a first sleeve portion 41 that approximates the outside diameter of the pole housing portion. A coupling means can be provided to allow for the boat mount assembly 40 to be removably coupled. In some exemplary embodiments, the coupling means can be a friction type coupling means that clamps the boat mount assembly to the pole housing portion. A mounting arm 42 can extend generally perpendicular from the sleeve portion 41 to be coupled to the boat. The arm 42 can have one or more apertures 43 to allow for a locking pin to couple the arm to a boat receiving. In other exemplary embodiments the arm can include other coupling means.

In another exemplary embodiment, an optional mounting assembly 40 can include a removably couplable tripod mount assembly as shown in FIG. 8. The tripod assembly 40 can include a first sleeve body portion, wherein the interior diameter of the sleeve generally approximates the outer diameter of the pole housing portion 27. A plurality of support arms 44 can be pivotably coupled to the center sleeve body. The support arms 44 can be extended or retracted to account for the size of a hole that has been drilled/cut into the ice to ensure that the apparatus does not fall through the ice hole.

In other exemplary embodiments, a second pole 31 can be housed within the first pole 21 and can be telescopic within the pole 21 to allow a user to adjust the depth of the pole within the water. The pole portion 20 can be comprised of a two-portion telescopic pole assembly with a first pole 21 and a second pole 31 to provide adjustment of the height of the transducer assembly 30, which can be coupled to the second end of the second pole 33. The first end 32 of the second pole 31 can be at least partially housed within the first pole 21. This can be useful when a user is in shallow water and may need to adjust the depth of the transducer 40 at the end of the pole portion 20. Any suitable coupling means can be used to maintain the pole 21 within the interior cavity of the pole 21, including but not limited to a friction coupling means. A clamp 80 or other fastening means can be used to apply pressure to maintain the position of the second pole 31 within the first pole 21.

In some exemplary embodiment, the first pole 21 can have a clamping portion 34. The clamping portion 34 can have one or more cuts or grooves configured to allow flexibility of the sidewall of the pole 21 to allow for a clamp 35 to apply pressure to the exterior surface of the pole and applying a compressive force against the exterior surface of the second pole 31 to secure it into a first position. Similarly, the clamp portion can have a clamp member 80 incorporated into the claim portions 35 of the first pole 21. Alternatively, other adjustable clamping or securing means can be utilized including but not limited to pull pins, wherein the second pole 31 can have one or more apertures along the length of the pole and a pin can be utilized to secure the second pole 31 at a desire position by placing it through corresponding apertures at the end of the first pole.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A mounting device for rotating a directional transducer around an axis comprising:
- a housing portion comprising:
  - a main body positioned between a top cover and a bottom cover, wherein the main body has an exterior sidewall and an interior sidewall, wherein the interior sidewall has a gear sidewall portion, wherein the main body is freely rotatable around a first vertical axis between the top cover and bottom cover at prescribed degrees of rotation;
- a lower pole portion, comprising;
  - a pole having a first end and a second end, wherein the first end of the pole has a gear interfacing cup having a cup portion and a gear portion, wherein the gear portion of gear interfacing cup interfaces with the gear sidewall portion of the main body, wherein the pole is freely rotatable around a second vertical axis at prescribed a rotational rate upon the movement of the main body at the prescribed rotational rate, wherein the pole rotates around the second vertical axis at a rate at least twice as great as the rotational rate of the main body, wherein the directional transducer is coupled to the second end of the pole;
- a directional indicator positioned at the top surface of the top cover, wherein the directional indicator is coupled to the first end of the lower pole portion and rotates around the second vertical axis at the same rotational rate of the pole;
- a first bushing positioned between the top cover and the main body; and
- a second bushing positioned between the main body and the bottom cover, wherein the first bushing and second bushing provide a smooth surface for the main body to freely rotate around the first axis.

2. The mounting device of claim 1, wherein the gear sidewall portion comprises half of the interior sidewall of the main body.

3. The mounting device of claim 2, wherein a handle portion is pivotably coupled to the main body of the housing portion, wherein the handle portion is coupled on the opposite side of the main body from the gear portion.

4. The mounting device of claim 3, wherein the lower pole portion rotates at least 360 degrees around the second axis when the main body is rotated around the first axis 180 degrees.

* * * * *